United States Patent [19]
Fournier et al.

[11] 3,896,209
[45] July 22, 1975

[54] REDUCTION OF HEXAVALENT CHROMIUM

[75] Inventors: Louis Byron Fournier; Raymond Alan Meyer, both of Wilmington, Del.

[73] Assignee: E. I. du Pont de Nemours & Company, Wilmington, Del.

[22] Filed: Jan. 22, 1973

[21] Appl. No.: 325,623

[52] U.S. Cl. .................. 423/55; 423/53; 423/607; 210/50; 210/53
[51] Int. Cl. .................. C01g 37/02; C01g 37/00
[58] Field of Search ......... 423/53, 55, 607; 210/50, 210/53

[56] References Cited
UNITED STATES PATENTS
2,110,187   3/1938   Williams ..................... 423/607 X
2,288,320   6/1942   Morey ........................ 423/607 X
3,819,051   6/1974   Henley et al. ................. 210/50

OTHER PUBLICATIONS

Baxendale, "Advances in Catalysis," Vol. 4, pp. 75–80.

*Primary Examiner*—Herbert T. Carter

[57] ABSTRACT

Under acidic conditions the hexavalent chromium present in aqueous solutions is chemically reduced to trivalent chromium with hydrogen peroxide. This process is improved if the pH of the aqueous solution is maintained below 1.5 and the hydrogen peroxide is gradually added to the solution to keep the chromate in excess as long as possible.

9 Claims, No Drawings

REDUCTION OF HEXAVALENT CHROMIUM

BACKGROUND OF THE INVENTION

Hexavalent chromium is an extremely toxic material. It can be found in many aqueous solutions, e.g., aqueous wastes such as the effluents from the electroplating industry such as plating and rinse baths, and also effluents from the phosphatizing, anodizing, tanning, pigments, and chemical industries. It can also be found in the blowdown from cooling towers and boilers.

The most commonly used method of treating such aqueous solutions containing hexavalent chromium is by chemical reduction to trivalent chromium followed by precipitation of the reduced chromium with alkali. The reducing agent is generally sulfur dioxide, a derivative such as a sulfite or a bisulfite, or ferrous sulfate.

With $SO_2$ as the reducing agent, for example as in large plating shops, expensive equipment is required to combine gaseous sulfur dioxide with the aqueous solution to be treated. There is an inherent danger and difficulty in handling and using this toxic and odorous gas. Furthermore, to insure rapid and complete reaction, the pH of the solution usually is adjusted to pH = 2.0–3.0 with sulfuric acid. Additional automated instrumentation is normally required for this purpose.

The approximate chemical usage during the $SO_2$ treatment should theoretically be about one pound of $SO_2$ per pound of chromium trioxide in the solution. However, in actual practice this required amount of $SO_2$ can be increased dramatically by species such as copper ion and oxygen dissolved in the solution to be treated. Just as in the chlorine treatment of waste waters where many materials present in solution can cause a high "chlorine demand" likewise, aqueous solutions, e.g., aqueous wastes, can have a background "sulfur dioxide demand" which may equal or exceed the quantity of sulfur dioxide required to treat dissolved hexavalent chromium.

To avoid the hazards and difficulties associated with $SO_2$ sodium bisulfite has been used as an alternate material for the reduction of hexavalent chromium. The bisulfite may be added as a solid or as a solution. The addition of acid, normally sulfuric, is required just as with $SO_2$ to maintain a pH of about 2 to 3 to obtain rapid and complete reduction of the hexavalent chromium. The anhydrous form of sodium bisulfite, $Na_2S_2O_5$, or sodium metabisulfite, also may be used in this reduction step.

However, sulfur compounds share with $SO_2$ a problem arising in municipal sewer systems when the sulfate ions formed from both processes are discharged. Through bacterial action in anaerobic sewers, sulfate ion forms sulfide ion; this leads to severe odor problems and also to crown corrosion, which is a primary cause of sewer cave-ins. Thus, both sulfur dioxide and bisulfite ion indirectly lead to damage in sewerage systems. Furthermore, excess sulfite needed in the reduction reaction imposes an oxygen demand.

In recent years other methods of removing chromium from solutions have been advocated such as the addition of barium ions, ion-exchange, reverse osmosis, dialysis, electrolytic reduction of hexa- to trivalent chromium, and the use of scrap iron to reduce chromium. None of these processes has gained the popularity of chemical treatment methods based on the reducing ability of sulfur compounds.

In the field of pollution abatement, hydrogen peroxide is an attractive alternative to commonly used chemical treatment methods since its reaction and decomposition products (oxygen and water) are nonpolluting. Moreover, excess reagent at normal levels is not itself detrimental to most environments and may, in fact, be beneficial. Additionally in the case of accidental spills or overtreatments hydrogen peroxide entering the environment in an uncontrolled fashion does not long persist.

It is known in the art that hydrogen peroxide is a reducing agent for hexavalent chromium in acid solution, e.g., S. B. Brown, Peter Jones and A. Suggett, *Chromium - Hydrogen Peroxide Reactions*, Adv. in Catalysis, 4, pp. 193–200. However this reaction is exceedingly complex and it is not quantitative under most conditions. As a result it has not been readily adapted to pollution control processes.

SUMMARY OF THE INVENTION

We have found that the reduction of hexavalent chromium to trivalent chromium in aqueous solutions, e.g., aqueous wastes, can be conducted on a quantitative basis if the pH of the aqueous solution is maintained below 1.5, preferably below 1.0, and the hydrogen peroxide is gradually added with agitation.

The pH of the reaction can be maintained in the desired range, by the addition of a mineral acid, e.g., hydrochloric, sulfuric, nitric or the like. It is important to note that during the reduction the pH of the solution increases, i.e., the reduction consumes hydrogen ions. Thus even if solution originally has a pH below 1.5, it must be maintained at this low level during the course of the reaction either by adding sufficient acid at the start of the reaction or adding it during the course of the reaction.

By "gradually added" it is meant that the hydrogen peroxide is added as slowly as is reasonably possible such that the chromate remains in excess as long as possible. The slower the hydrogen peroxide is added, the better. Thus it is preferred to add the hydrogen peroxide dropwise. When the hydrogen peroxide is rapidly added, a high concentration of $H_2O_2$ will be formed in the solution and side reactions will occur. In this event the overall reaction will be less efficient.

The agitation is desirable to avoid local excesses of the hydrogen peroxide during the addition.

DESCRIPTION OF THE INVENTION

The hexavalent chromium ion is found in small concentrations in a multiplicity of industrial solutions, but the source of most such solutions is the rinse waters from chromic acid baths, or the discarded baths themselves, as used by the metal finishing industries concerned with the cleaning of metals or with the coating of them with chromium in electroplating and anodizing processes.

Most of the baths employed in these industrial operations are acid, usually being made up with (1) "chromic acid," $CrO_3$, and sulfuric acid or sodium sulfate or (2) sodium dichromate, $Na_2Cr_2O_7 \cdot 2H_2O$ and sulfuric acid. Anions such as the sulfate ion, chloride ion, or fluoride ion, is generally present in an amount equivalent to about one-hundredth of the chromic acid content. The concentration of hexavalent chromium in these aqueous solutions can range from 20 to 300,000 ppm.

The process of the invention is broadly applicable to any aqueous solution containing hexavalent chromium, and can be used with solutions at room temperature or solutions at elevated temperatures. It is particularly useful with aqueous wastes. Thus it can be used with metal plating baths, which are at elevated temperature and contain larger amounts of hexavalent chromium or it can be used with metal plating rinses which are usually at room temperatures and contain up to 100 ppm of hexavalent chromium.

The aqueous solution is first treated with sufficient mineral acid to insure that the pH will be maintained below 1.5, preferably below 1.0, throughout the entire reduction reaction. As set forth previously this requires the addition of excess acid as the reaction itself causes a rise in pH. In a less desirable embodiment, additional acid can be added during the course of the reaction to maintain the desired pH. If the pH rises above pH 1.5 during treatment, chromium reduction still occurs, but the reaction is less efficient.

The hydrogen peroxide is then gradually added to the aqueous solution with agitation. It is believed that the reaction is represented by the following equation:

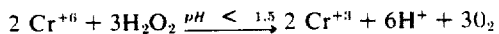

$$2\ Cr^{+6} + 3H_2O_2 \xrightarrow{pH\ <\ 1.5} 2\ Cr^{+3} + 6H^+ + 3O_2$$

Thus the stoichiometry of the reaction requires 3 moles of hydrogen peroxide for every 2 moles of hexavalent chromium. Generally a slight excess, i.e., up to 10% excess, of hydrogen peroxide will be added over the course of the reaction.

The hydrogen peroxide is gradually added in order to provide the highest reaction efficiency. The slower the hydrogen peroxide is added, the more efficient is the reaction. The best embodiment is to add the hydrogen peroxide dropwise. When a drop is added there is an immediately reaction and a blue color is formed. This blue color disappears in a short time, ½ to 1 minute; at that time, another drop can be added.

It is of course clear that such dropwise addition may not be practical under all circumstances and a faster rate of addition will need to be employed. The important point is that the rapid addition of the hydrogen peroxide is to be avoided, i.e., the chromate is to be kept in excess as long as possible.

The reaction time is closely related to the rate of hydrogen peroxide addition since the reaction occurs immediately. If the rate of addition is too fast, side reactions will occur.

At the end of the reaction the hexavalent chromium will have been reduced to trivalent chromium. In many operations this will be all that is necessary and the resulting solution, with or without additional dilution, can be discharged.

In other operations it will be desirable to remove the trivalent chromium by precipitation. This is usually accomplished by the addition of alkali to obtain a pH of 8 to 9 to precipitate chromium trihydroxide or a basic chromium salt such as the sulfate. The precipitated hydroxide sludge is then removed from the treated waste by filtration, centrifugation or settling. The alkali can be any alkaline earth metal or alkali metal oxide or hydroxide, e.g., sodium hydroxide, calcium hydroxide, etc.

However if after the reduction reaction any excess hydrogen peroxide is present, it can cause a problem during the precipitation step. Thus when the pH is increased to precipitate the chromium hydroxide, the excess hydrogen peroxide will reoxidize some trivalent chromium to hexavalent chromium. Thus it is desirable to ensure that no excess peroxide is present in the aqueous solution when the alkali is added if the small amount of hexavalent chromium thus created will cause a problem.

This can be accomplished simply by permitting the solution to stand for whatever time is required to decompose the peroxide by whatever decomposition catalysts may be present in the solution. Ferric ion, for instance, is such a catalyst and is almost invariably present in plating waste.

Alternatively the destruction of this excess peroxide can be accomplished by the addition of a reducing agent such as $SO_2$ or a derivative, e.g. sodium bisulfite or metabisulfite or other sulfur compounds, e.g., thiosulfates, sulfides, or hydrosulfites. This method has the advantage in that if any chromate is still present, it is also destroyed. The excess peroxide and chromate can also be removed by activated carbon or iron.

The following examples are offered to illustrate the process of the invention.

EXAMPLE 1

(SAMPLE A) 100 ml of a zinc dip bath sample (containing 5,360 ppm of hexavalent chromium) is placed in a 150 ml beaker and 5.5 ml of 7.56N sulfuric acid is added. This acid is sufficient to maintain the pH of the sample below 1.5 during the reaction. Hydrogen peroxide (5.62N) is added with agitation in 1 ml aliquots, allowing about 2 minutes between additions.

Analysis indicated that residual hexavalent chromium is 80 ppm after 6 ml of hydrogen peroxide is added (9% excess) and that 13 ppm are present after 7 ml (27% excess).

(SAMPLE B) This sample was the same as A except that the hydrogen peroxide addition was dropwise at approximately 1 ml per 3 minutes. Residual hexavalent chromium is 4 ppm with 9% excess hydrogen peroxide and 2 ppm with 27% excess.

These samples demonstrate the effect of the hydrogen peroxide addition rate.

EXAMPLE 2

This reaction was conducted in the same manner as for Sample A of Example 1 except no sulfuric acid was added. The initial pH of the bath was 1.15. After the addition of 9% excess hydrogen peroxide, the pH was 2.13 and residual hexavalent chromium was 4,300 ppm.

EXAMPLE 3

100 ml of a chrome plating rinse (contains 39 ppm of hexavalent chromium) is adjusted to pH 1.50 with 1% sulfuric acid. To the rinse is added dropwise 0.165N hydrogen peroxide. At 3% excess hydrogen peroxide, residual hexavalent chromium is 0.8 ppm.

We claim:

1. A method for treating an aqueous industrial waste solution containing hexavalent chromium ions to reduce the hexavalent chromium ions to trivalent chromium ions comprising the steps of
   a. adjusting and maintaning the pH of the ion solution to a level below 1.5 by the addition as necessary of mineral acid; and
   b. slowly adding hydrogen peroxide to the thusly acidified ion solution with continuing agitation to avoid local excesses of the peroxide and to promote an excess of chromate until addition of the peroxide is substantially complete, the amount of hydrogen peroxide added being at least equal to the stoichiometric amount necessary to reduce all of the hexavalent chromium in the ion solution to trivalent chromium.

2. The method of claim 1 wherein the pH is maintained below 1.

3. The method of claim 1 wherein the aqueous solution is an electroplating rinse.

4. The method of claim 1 wherein the aqueous solution is an electroplating bath.

5. The method of claim 1 wherein subsequently the solution is treated with alkali to precipitate chromium trihydroxide and the chromium trihydroxide is separate from the aqueous solution.

6. The method of claim 5 wherein a reducing agent is added to the solution prior to the addition of the alkali.

7. The method of claim 1 wherein the aqueous solution is a zinc dip bath.

8. The method of claim 1 in which the amount of hydrogen peroxide added is up to 27% in excess of the stoichiometric amount.

9. The method of claim 8 in which the amount of hydrogen peroxide added is up to 10% in excess of the stoichiometric amount.

* * * * *